June 8, 1971
M. J. SIGMANS
3,583,060
METHOD OF SWAGING A METAL FITTING ON A STEEL WIRE
Filed Dec. 30, 1968
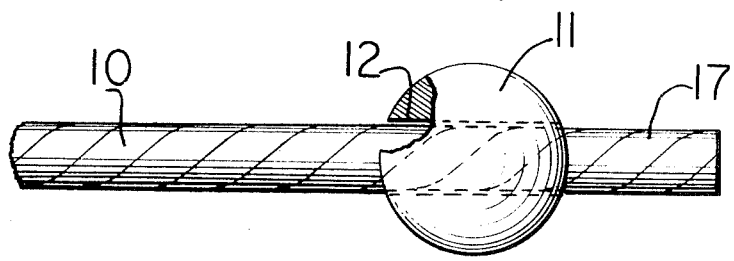
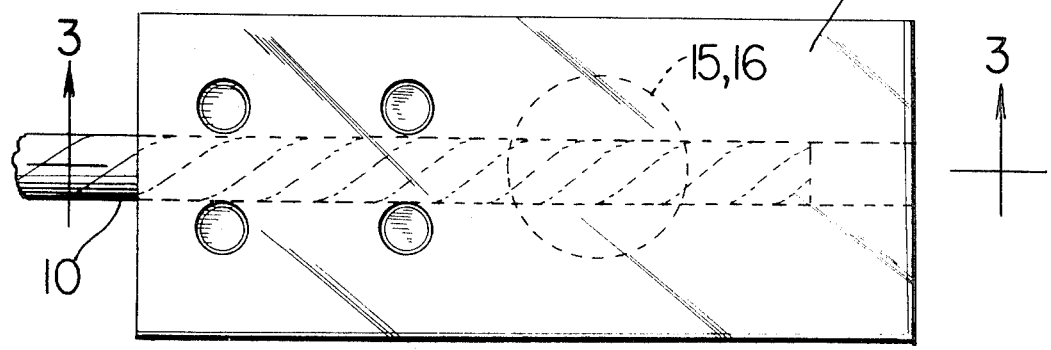
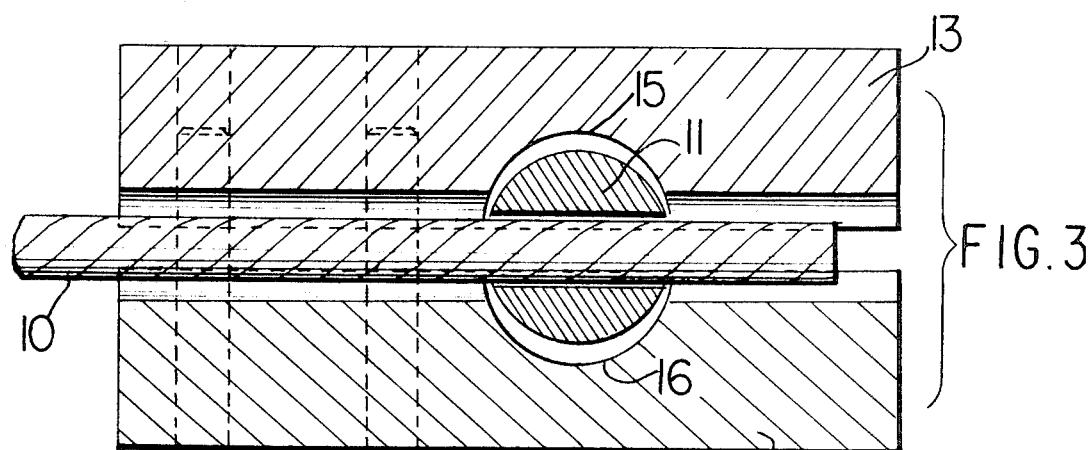
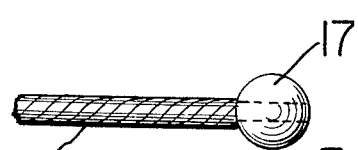
INVENTOR
MAURICE J. SIGMANS
BY Smythe & Moore
ATTORNEYS

United States Patent Office 3,583,060
Patented June 8, 1971

3,583,060
METHOD OF SWAGING A METAL FITTING ON A STEEL WIRE
Maurice J. Sigmans, Quakertown, Pa., assignor to Ametek, Inc., New York, N.Y.
Filed Dec. 30, 1968, Ser. No. 787,939
Int. Cl. B23p 9/00
U.S. Cl. 29—445                                7 Claims

ABSTRACT OF THE DISCLOSURE

The unique properties of beryllium copper are used to increase the holding power of small fittings swaged to stranded stainless steel cable.

---

In many applications it is desired to provide the end of a cable with a suitable form of end fitting to enable the end of the cable to be gripped in a socket or similar structure. It is often required that such end fittings be very simple in structure with a uniformly curved contour. Where the cable is of stranded stainless steel and the end structure is subjected to a pull that approaches the ultimate strength of the cable, it has been difficult to mount a fitting onto the cable which would withstand such a pull. This is particularly true when the cable in question is relatively small in diameter such as on the order of about one-eighth inch O.D., and where the gripping length of the fitting must not exceed approximately three times the diameter of the cable. For example, metallic balls of various materials have been swaged onto stainless steel cables but such fittings were unsatisfactory since the connection between the ball and the cable failed at much lower values than the ultimate strength of the cable, unless the ball was large compared to the diameter of the cable.

One of the objects of the present invention is to provide an improved fitting for a stainless steel cable which will withstand relatively heavy pulls.

Another of the objects of the present invention is to provide a method for mounting a metallic ball or fitting upon a stainless steel cable to form an end fitting which will withstand a strong pull.

According to one aspect of the present invention, a ball of beryllium copper has a bore formed therethrough. The cable is then passed through the bore of the ball so that the ball is positionel adjacent an end of the cable. The ball is then swaged onto the cable. After swaging, the end portion of the cable protruding from the ball may be cut off and the remaining portion finished smooth with the outer surface of the ball. The assembly of the ball and cable is then heat treated to achieve maximum hardness of the ball and to cause the ball to shrink.

Other objects, advantages and features of the present invention will be apparent from the accompanying description and drawings, which are merely exemplary.

In the drawings:

FIG. 1 is an elevational view of the ball end fitting mounted upon a stainless steel cable according to the present invention;

FIG. 2 is a top plan view of the dies for swaging the ball onto the cable;

FIG. 3 is a sectional view taken along the line 3—3 of FIG. 2; and

FIG. 4 is an elevational view of the completed ball end fitting on a stainless steel cable.

As may be seen in FIG. 1 there is shown at 10 a stainless steel braided or stranded cable having, for example, a diameter of 0.043 inch. The end fitting is a ball 11 having, for example, an outer diameter of 0.131 inch. A diametrical bore 12 having, for example, a diameter of 0.046 inch is drilled through or formed in ball 11.

The ball 11 is formed from beryllium copper alloy. It has been determined that in order for the end fitting to be suitable it must have several physical properties as discussed below. The material must be ductile in the annealed state so that it can be tightly swaged onto the stainless steel cable. The material should be heat treatable to a hardness of approximately Rockwell "C" 38. On heat treatment, the material must increase in density which correspondingly produces a contraction in volume to impart additional gripping strength in the swaged connection. The material must be reasonably corrosion resistant. Several materials can meet the shrinkage and hardenability requirements. However, these materials all require heat treatment at temperatures over 1000° F., and at this temperature the physical properties of the stainless steel cable are degraded. However, beryllium copper meets all of the above requirements but requires heat treatment at a temperature less than the temperature which would adversely affect the physical properties of the stainless steel cable. A beryllium copper alloy that has been found satisfactory is that sold by the Beryllium Corporation with the designation "Berylco 25." It has a composition of beryllium 1.80–2.05%; cobalt 0.20–0.30%; and the balance copper.

Cable 10 is inserted through the bore 12 so that the ball is positioned near the end of the cable as shown in FIG. 1. The ball is then placed in the cavity of a pair of swaging dies 13 and 14 as shown in FIGS. 2 and 3. In addition to the spherical cavities the die halves are provided with longitudinally extending grooves or tracks to accommodate the cable. When the die halves are placed together, spherical cavities 15 and 16 will form a sphere having a diameter of 0.125 inch.

The ball which has a diameter of 0.131 inch is then swaged onto the cable by pressing the two die halves together in a press. The ball and cable are then rotated 90° within the dies and again compressed in the press. The rotation of the ball and pressing is repeated as often as necessary to achieve a finished ball fitting having a diameter of 0.125 inch.

After the ball has been formed, the end of the cable indicated at 17 may be cut off and the small portion remaining ground or finished flush with the outer peripheral surface of the ball as indicated at 18 in FIG. 4.

The assembly of the beryllium copper ball and the stainless steel cable is then heat treated at, for example, 650° F. for 3 hours to achieve the desired hardness of the ball.

As an example, eight ball and cable assemblies having the dimensions described above, were made according to the process as described above and subjected to a pull test. Each one of the assemblies withstood a 270 pound pull without any damage or impairment to the ball or cable.

It is thus apparent that according to the present invention an oversized metallic fitting is swaged down to the required size. When heat treated, the fitting hardens so as to eliminate any pull-out of the cable from the soft fitting and shrinks so as to give greater gripping strength than can be obtained by swaging alone. Beryllium copper is particularly adaptable to the present invention because it can be heat treated to a hardened condition at a temperature considerably below the annealing point of a stainless steel cable. If a heat treatable steel were used for the fittings, the cable would be annealed during the ball hardening process and would cause the cable to be weakened.

It will be understood that various details of construction and arrangement of parts may be made without departing from the spirit of the invention except as defined in the appended claims.

What I claim is:

1. A method of mounting a metallic fitting on a stainless steel cable, comprising the steps of forming a diametrical bore through said metallic fitting, passing the cable through the bore of the fitting, swaging the fitting onto the cable, and heat treating the fitting to shrink and harden same after being swaged onto the cable without annealing the cable.

2. A method as claimed in claim 1 wherein said fitting is of beryllium copper.

3. A method as claimed in claim 1 with said fitting being annealed before mounting on the cable.

4. A method as claimed in claim 1 with said fitting being mounted near the end of the cable.

5. A method as claimed in claim 1 with said fitting being oversized and swaged down to the desired size.

6. A method as claimed in claim 1 with said fitting being a ball and having a diameter about three times the outer diameter of the cable.

7. A method as claimed in claim 4 and the step of cutting off the protruding cable end and grinding away the cable flush with the outer surface of the fitting.

References Cited

UNITED STATES PATENTS

| | | | |
|---|---|---|---|
| 1,949,601 | 3/1934 | Burd | 24—123 |
| 1,959,402 | 5/1934 | Anderson | 140—111X |
| 2,209,673 | 7/1940 | Bratz | 29—515X |
| 2,308,669 | 1/1943 | Beed. | |
| 2,357,733 | 9/1944 | Guderian | 29—517X |
| 2,889,603 | 6/1959 | Joy et al. | 24—123 |
| 2,902,537 | 9/1959 | Salvi | 24—123 |
| 2,959,436 | 11/1960 | Duda. | |
| 3,002,046 | 9/1961 | Clapper. | |

CHARLIE T. MOON, Primary Examiner

U.S. Cl. X.R.

24—123; 29—447, 517; 140—111; 148—127; 287—20.3, 75